Figure 1:
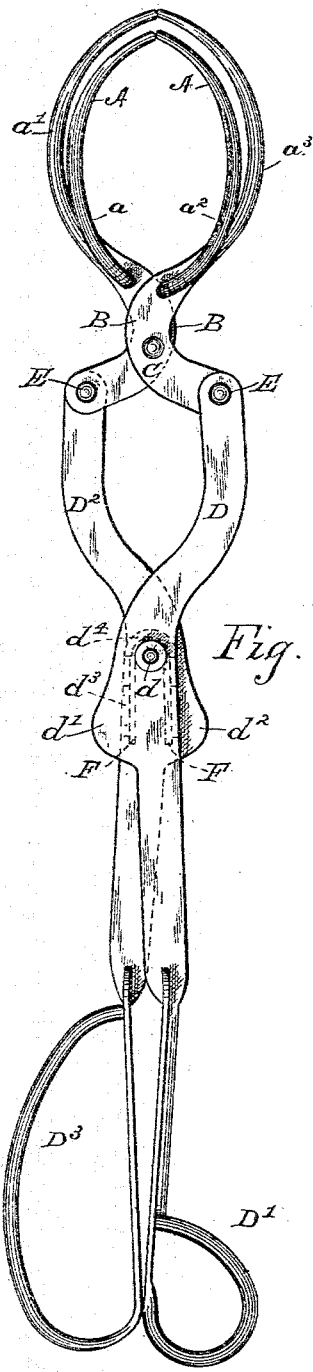

(No Model.)

W. E. MELHORN.
KITCHEN UTENSIL KNOWN AS COOKS' TONGS.

No. 356,657. Patented Jan. 25, 1887.

WITNESSES
John C. Miller
Percy White

INVENTOR
Wm. E. Melhorn
per Robt. J. Murray,
Attorney

UNITED STATES PATENT OFFICE.

WILLIAM E. MELHORN, OF ERIE, PENNSYLVANIA, ASSIGNOR TO SAMUEL S. CAUGHEY, OF SAME PLACE, AND FRANK T. CAUGHEY, OF UNION CITY, MICHIGAN.

KITCHEN UTENSIL KNOWN AS COOKS' TONGS.

SPECIFICATION forming part of Letters Patent No. 356,657, dated January 25, 1887.

Application filed March 6, 1886. Serial No. 194,225. (No model.)

*To all whom it may concern:*

Be it known that I, WILLIAM E. MELHORN, a citizen of the United States, residing at Erie, in the county of Erie and State of Pennsylvania, have invented certain new and useful Improvements in Kitchen Utensils known as "Cooks' Tongs," of which the following is a specification, reference being had therein to the accompanying drawings.

The object of this improvement is to provide tongs specially adapted for use in the kitchen as a cooking utensil, or that may be made of suitable size and form and used as fire-tongs. These results are attainable by the mechanism illustrated in the drawings herewith filed as part hereof, in which the same letters of reference denote the same parts in the different views.

Figure 2:
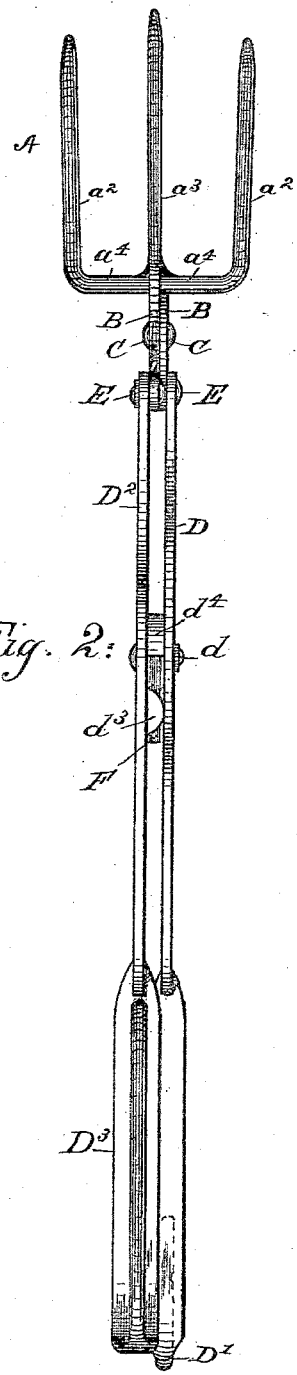

Figure 1 is a side elevation representing tongs embodying the features of my improvement. Fig. 2 is a front view of the same.

A A are the tongs-jaws, having prongs $a\ a'$ $a^2$ and provided centrally with rearward and outwardly curved extensions B B, pivotally connected to each other by a rivet and burr, as shown at C.

D $D^2$ are operating-handles, pivotally connected to each other by a rivet and burr, as shown at $d$, and provided with outwardly-curved inner ends, which are pivotally connected by burrs and rivets to the ends of the curved jaw-extensions B B, as shown at E E.

The outer ends of the handles D $D^2$ are preferably formed with thumb and eye stays similar to shears-handles, as shown at $D'\ D^3$, but may be made in any suitable or convenient shape. Each of the handles D $D^2$ is provided with an extension adjacent to its connecting-rivet $d$, as shown at $d'\ d^2$. The straight edges of the handles D $D^2$ are provided with inward flanges, as shown at $d^3$ in Fig. 2, which engage with a spring, F, which is securely held in the position shown by the flanges $d^3$, the extensions $d'\ d^2$, and a rib, $d^4$, affixed to or made integral with the handle $D^2$.

The central prongs of the tongs-jaws are given a wider curve than the outer prongs, in order that the jaws may be better adapted to securely grasp objects of oval or round forms—such as eggs or potatoes—and lifting the same from pots or kettles without breaking or bruising the same.

By reason of the outwardly-curved extensions B of the tongs-jaws connecting the same with the tongs-handles, the movement of the latter away from each other at their outer ends will cause the jaws to open very widely, and be thereby adapted to grasp and lift objects of large form—such as heads of cabbage or pieces of meat—and their inward movement will cause the jaws to clutch or hold objects similar to those mentioned.

If desired, the pronged jaws may be made flat for use as fire-tongs. The implement may be made of various shapes and sizes, and thus suited to various purposes. The spring F may be dispensed with, if desired, the only object of the spring being to give the tongs-jaws tension on the articles to which they are applied without the operation of the handles D $D^2$ by the hands of the user.

I am aware that hand grappling-tongs have before been made with pronged jaws pivotally connected by an interposed link with a spring-actuated bar operating in a cylinder. This, therefore, I lay no broad claim to; but What I do claim as new and of my invention is as follows—viz:

1. In a grappling-tongs, the combination, with the pronged jaws A $a$, formed with backwardly-curved extension B, pivoted together, of the operating-handles D $D^2$, pivoted together and to the curved extensions B B of the jaws, formed with inward flanges $d^3$, extensions $d'\ d^2$, and rib $d^4$ adjacent to their connecting-pivot, and spring F, substantially as and for the purpose described and shown.

2. As an improved article of manufacture, the grappling-tongs herein described, composed of the pronged jaws A A $a\ a'\ a^2$, each formed with a backwardly-curved extension, B B, pivoted together at C, operating-handles D $D^2$, pivoted together at $d$, and to the curved extensions B B of the jaws at E, and spring F, all constructed and adapted for operation as and for the purposes stated.

In testimony whereof I affix my signature in presence of two witnesses.

WILLIAM E. MELHORN.

Witnesses:
CHARLES H. LOVRIEN,
JACOB GEIB.